Dec. 28, 1965 R. H. TYLER 3,226,476

TELEVISION SCANNING DEVICE FOR PROVIDING REMOTE MOTOR INDICATION

Filed March 16, 1964 3 Sheets-Sheet 1

INVENTOR.
ROY H. TYLER
BY
Owen, Wickersham & Erickson
ATTORNEYS

Dec. 28, 1965 R. H. TYLER 3,226,476

TELEVISION SCANNING DEVICE FOR PROVIDING REMOTE MOTOR INDICATION

Filed March 16, 1964

3 Sheets-Sheet 2

INVENTOR.
ROY H. TYLER

BY

Owen, Wickersham & Erickson
ATTORNEYS

Dec. 28, 1965 R. H. TYLER 3,226,476

TELEVISION SCANNING DEVICE FOR PROVIDING REMOTE MOTOR INDICATION

Filed March 16, 1964 3 Sheets-Sheet 3

INVENTOR.
ROY H. TYLER

BY

Owen, Wickersham & Erickson
ATTORNEYS

United States Patent Office 3,226,476
Patented Dec. 28, 1965

3,226,476
TELEVISION SCANNING DEVICE FOR PROVIDING REMOTE MOTOR INDICATION
Roy H. Tyler, 1410 Dallas St., Wellington, Tex.
Filed Mar. 16, 1964, Ser. No. 352,048
3 Claims. (Cl. 178—6)

This invention relates to a remote visual information monitoring system and more particularly it relates to a system for televising or photographically recording the activity in a prescribed area. This application is a continuation-in-part of my co-pending application Serial No. 219,156, filed on Aug. 24, 1962, now abandoned.

My invention has important applications in many fields, but in particular it solves the problem of providing a visual reproduction of an array of constantly varying instrumentation dials or gauges supplying related portions of information to a large number of observers at remote viewing stations. A long-felt need for my invention arose in connection with the problem of supplying weather data and other information simultaneously to a large number of persons in certain widely spread localities by means of regular or close circuit television channels and by a system that required a minimum number of personnel. To solve this problem I devised a system wherein the vital weather data is measured and displayed on a series of dials capable of indicating current temperature, atmospheric pressure, wind velocity, and other variable factors. The problem then arose of providing a means whereby these dials could be automatically scanned at intervals by a television transmitter so that they can be viewed and visually monitored on a large number of remote receivers.

In summarizing the foregoing, it is therefore a general object of my invention to provide a system for visually monitoring a prescribed area such as one occupied by an array of instruments with either photographic or television camera equipment so that the instruments or the subject matter recorded can be easily viewed at remote stations.

A particular problem in visually monitoring a large number of dials or gauges was that of reproducing a picture wherein each dial appears large enough on the viewing screen and is clear and distinct. Bunching a large number of dials together and including them within a single picture by means of a wide angle lens is unsatisfactory because each individual dial becomes too small and is thus hard to read on the television screen. My invention solves this problem by providing an apparatus wherein the dials or gauges are mounted in a fixed spaced apart relationship on an elongated upright panel which is connected to and positioned relative to a movable or rotatable platform adapted to transverse or oscillate repetitively within predetermined limits and at a controllable rate back and forth before the panel.

Another object of my invention is to provide a scanning device employing a movie camera or a television transmitter that achieves a smooth continuous back and forth travel before an extended or elongated subject without requiring an intermittent reversal of the driving motor to reverse the direction of travel.

Still another object of my invention is to provide an apparatus for visually monitoring an elongated target area containing data indicating devices and the like that can be automatically or manually controlled at a position located remotely from the apparatus and which can be operated either continuously or intermittently.

Another object of the invention is to provide a visual monitoring device for scanning a prescribed area that is low in maintenance and operating cost as well as being unusually well adapted for ease and economy of manufacture.

Yet another object of my invention is to provide an automatic self-operating information transmission apparatus that is particularly compact and which can accommodate a number of information dials on a curved upright support located at the proper viewing distance from a camera mounted on a rotatable pedestal.

A further understanding of the invention together with more of its objects and advantages will appear from the following detailed description presented in accordance with 35 USC 112. The use of certain specified materials and the utilization of some details of construction which appear in this description are to be considered as illustrative examples only, rather than as limitations upon the invention or upon the appended claims.

Figure 1:
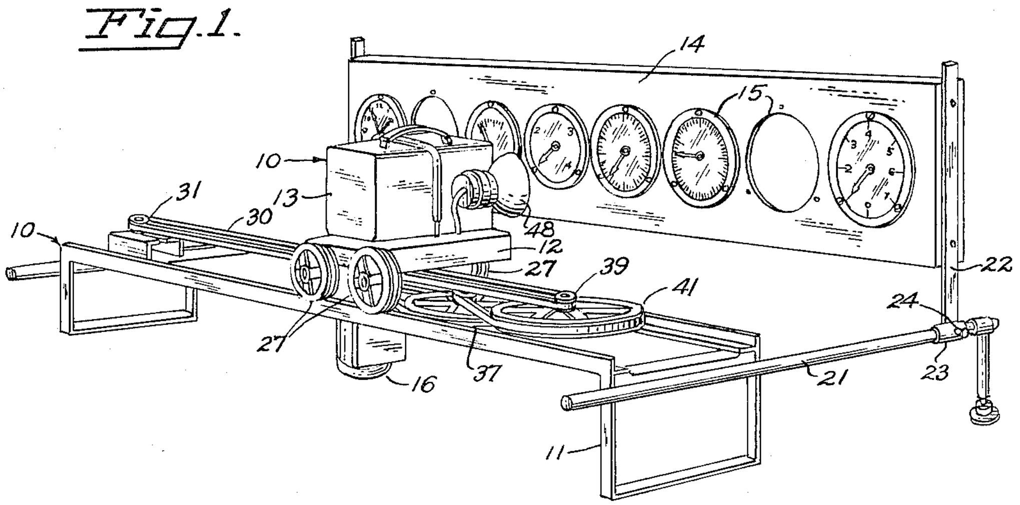
FIG. 1 is a view in perspective of a visual monitoring device embodying the principles of the invention.
Figure 4:
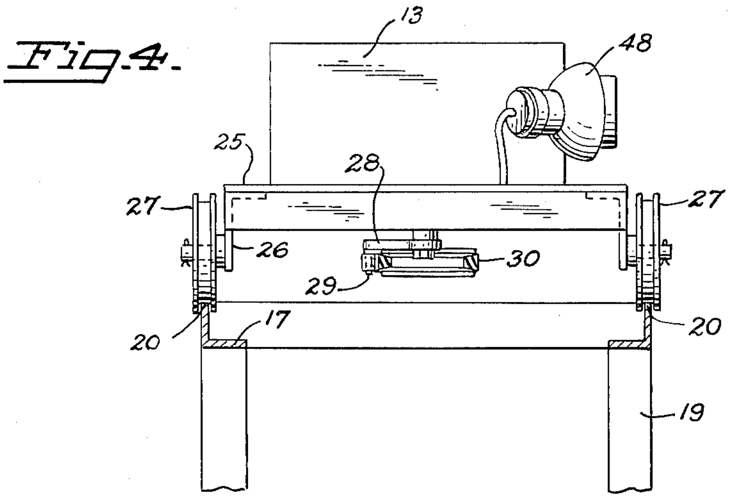
FIG. 4 is a view in end elevation and in section taken along the line 4—4 of FIG. 2.
Figure 5:
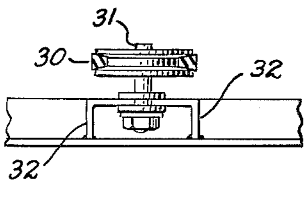
FIG. 5 is a fragmentary view in elevation and in section taken along the line 5—5 of FIG. 2.
Figure 2:
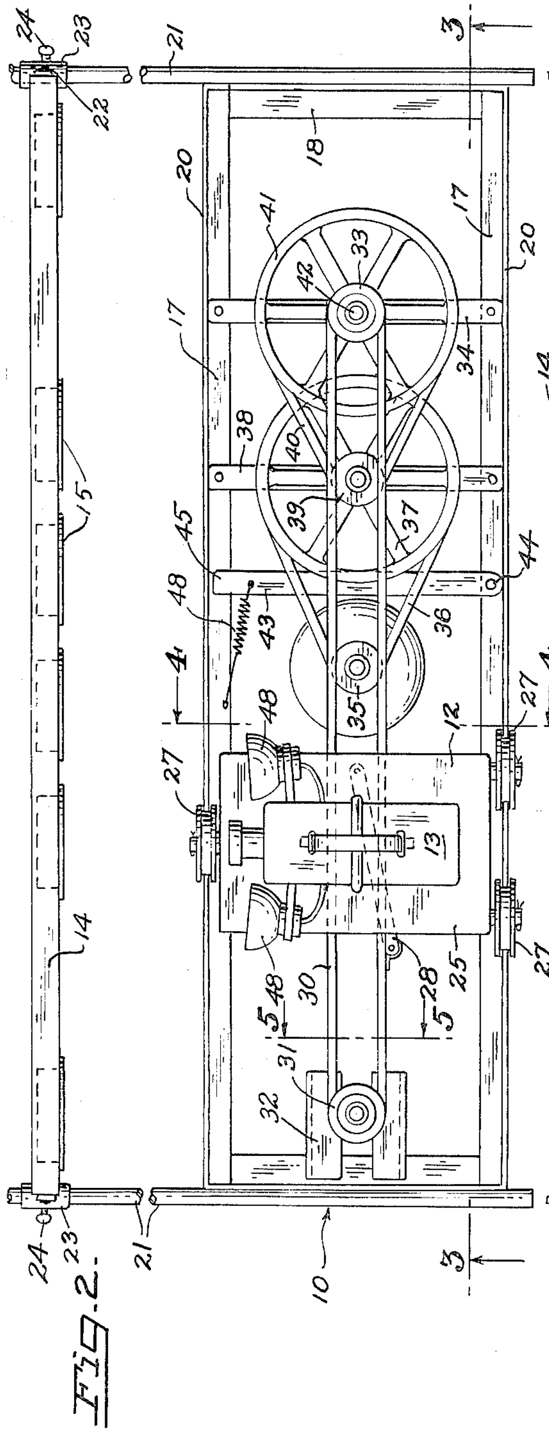
FIG. 2 is a plan view of the visual monitoring device of FIG. 1.
Figure 3:
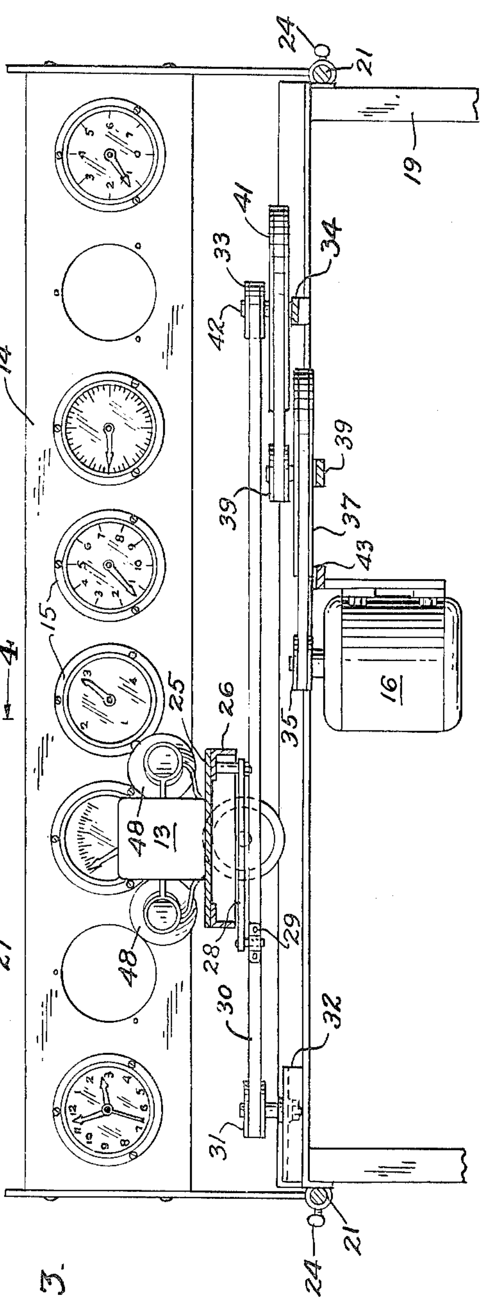
FIG. 3 is a view in side elevation and in section of the device of FIG. 2 taken along the line 3—3.

Referring to the drawings, FIG. 1 shows a visual information device 10 embodying the principles of the invention as it appears when in operation. Generally, it comprises a support frame 11 on which is movably mounted a platform 12 supporting a television transmitting device 13 or a movie camera and an elongated panel 14 to which are fixed a series of the subjects to be monitored such as a number of dials or gauges 15. The movable platform 12 is driven by an electrical motor 16, and by virtue of the novel arrangement of elements in accordance with the invention it transverses back and forth in front of the panel 14 at a fixed uniform distance therefrom and at a uniform rate. The entire apparatus 10 may be remotely installed in some convenient location and is preferably wired so that it can be operated automatically by remote control. In a closed circuit television system, for example, the system 10 can be actuated automatically at predetermined intervals to scan a series of dials indicating the existing weather conditions.

Turning to the details of construction of the embodiment of my device shown in FIGS. 1–5, the entire apparatus 10 including the movable platform 12 and panel 14 is connected together as an integral structure by the support frame 11. The latter is formed by a pair of parallel spaced apart longitudinal members 17 connected by transverse members 18 and attached to vertical leg members 19 located at the ends of the frame. The longitudinal members 17 preferably are made from right angle structural members and are arranged with their vertical flanges 20 serving as guide rails for supporting the movable platform 12.

The display panel 14 is adjustably attached to a pair of transverse members 21 fixed to the ends of the support frame 11. Attached to tthe ends of the panel 14 by means of a pair of vertical end members 22 are sleeve members 23 adapted to fit slidably on the transverse members 21. Each sleeve member 23 is provided with a set screw 24 so that it can be rigidly held in position on its transverse member 23. Thus the panel 14 is readily adjustable to the proper distance from the support rails 20 and hence the movable platform 12.

The movable platform 12 for the television or movie camera 13 is controlled in such a manner that it continuously traverses back and forth along the length of the rails 20 at a constant fixed distance from the panel 14 when the device is in operation. Generally, the platform 12 comprises a rectangular plate 25 stiffened along its sides by a pair of angle members 26 and having grooved wheels 27 rotatably mounted at opposite ends and spaced apart the same amount as the rail members 20. On one side of the platform 12 and mid-way between the wheels 27 at its ends is pivotally mounted a connecting draw bar 28. At its other end the draw bar 28 is pivotally connected to a bracket 29 fixed to a continuous belt 30. The belt 30 is supported between the longitudinal frame members 17 at a pulley 31 fixedly mounted in a support bracket 32 at one end of the frame 11. Near the other end of the frame the belt 30 is connected around a similar pulley 33 which is equal in size to the pulley 31 and rotatably supported on a transverse member 34 attached to the longitudinal members 17.

The belt 30 is driven at a constant relatively slow rate by the electric motor 16 that is vertically mounted between the longitudinal members 17 of the frame 11. In order to obtain the speed reduction of the motor to facilitate a relatively slow even belt travel, the motor shaft pulley 35 is first connected by means of a belt 36 to a relatively large diameter sheave 37 mounted on a fixed cross support member 38 connected to the longitudinal members 17. On the shaft of the large sheave 37 is a smaller pulley 39 and another belt 40 is attached around it and around a second large sheave 41 fixed to the same shaft 42 as the main drive belt pulley 33.

The motor 16 itself is fixed to a cross member 43 that is pivotally mounted at one end 44 to one of the longitudinal members 17. The opposite end 45 of the cross member 43 is unattached but supported vertically on the horizontal flange 48 of the other longitudinal frame member 17 and is also connected thereto by a spring 47 that tends to pull the motor 16 away from the first large sheave 37 thus maintaining the proper tension in the motor belt 36.

In operation, the apparatus 10 may be situated in any suitable location where the dials 15 on the elongated information panel 14 can be wired to receive their input signals. The driving motor 16 for the movable platform 12 can be remotely controlled by conventional means (not shown) and, if desired, automatically actuated so that the platform 12 will commence and stop its travel either on command or at predetermined timed intervals. When the motor is energized to operate at a constant rate, the drive belt 30 moves at the normal constant speed and moves the draw bar 28 along a continuous path thereby pulling the platform 12 back and forth parallel to the information panel 14. The television transmitter 13 is mounted in any suitable manner on the platform 12 with its line of sight constantly directed at substantially a right angle to the information panel 14, the panel being adjusted to the proper distance so that the desired maximum field of view for the television camera will be utilized for the transmitted picture of each dial 15. A standard light bar 48 with suitable lamps may be attached to the television camera 13 to assure adequate illumination as the platform 12 moves along in front of the panel 14.

Figure 6:
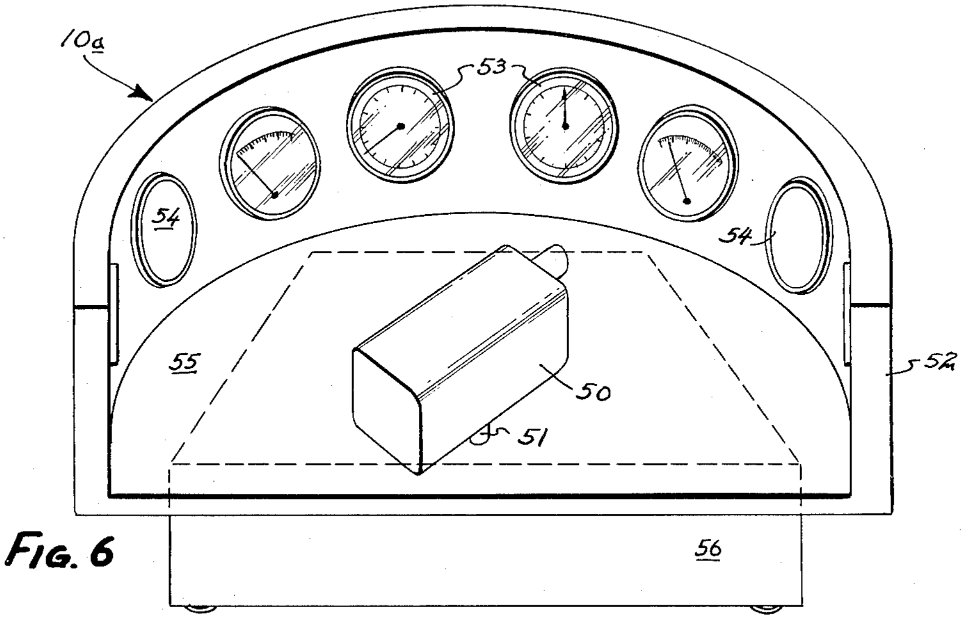
FIG. 6 is a frontal view in perspective of a somewhat modified form of visual monitoring device according to the invention.
Figure 7:
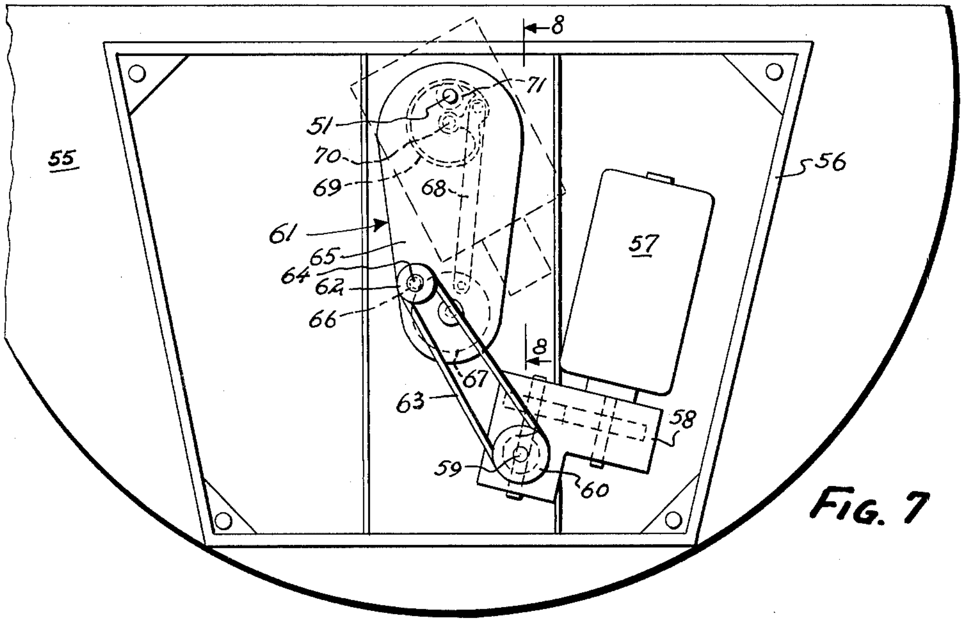
FIG. 7 is an enlarged fragmentary plan view of the device shown in FIG. 6.
Figure 8:
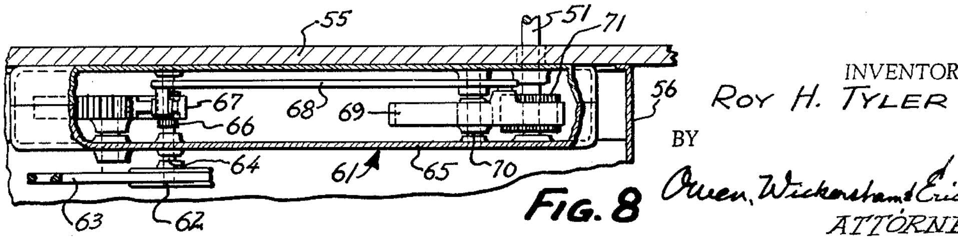
FIG. 8 is an enlarged view in section taken along the line 8—8 of FIG. 7.

A somewhat modified form of my invention is shown in FIGS. 6–8 and designated generally by the numeral 10*a*. Here, a small television camera 50 is mounted for partial rotation on an upright shaft 51. This shaft 51 is located substantially equally in distance from all points on the surface of an upright semi-circular support 52 for a plurality of dial instruments 53 or openings 54 in which various subject matter to be televised can be supplied. If the apparatus is to be used as a weather information broadcasting device, various dial instruments such as a clock, a temperature indicator, a barometer, a rain gauge, a wind velocity dial and any other similar type indicator can be utilized. Each instrument is fixedly mounted in a suitable manner on the curved support board 52. The latter is preferably fixed to a semi-circular shaped horizontal platform 55. This platform is supported on its underside by a base frame 56 which also houses a drive mechanism for swinging the camera back and forth through an arc at a constant scanning rate.

The camera drive mechanism is shown in FIGS. 7–8 and provides a means for converting the constant shaft rotation output of a standard electric motor to a reversible partial rotation of the camera supporting shaft 51. As shown, the drive motor, designated by the numeral 57, is connected to a gear reduction box 58 which produces an output of a reduced r.p.m. at an upright shaft 59 to which is connected a pulley sheave 60. Fixed adjacent to the motor 57 and its gear box 58 is an oscillating gear mechanism 61 having an external input sheave 62. A belt 63 connects the sheaves 60 and 62. The gear mechanism is adapted to provide an oscillating or reversible partial rotation to its output shaft which extends upward through the platform 55 and becomes the camera supporting shaft 51. Essentially, this gear mechanism functions as follows: an input shaft 64 connected to the sheave 62 extends within a housing 65 for the gear mechanism 61, and a gear 66 fixed to the shaft 64 drives a larger pinion gear 67. The latter is connected by an eccentric crank or connecting rod 68 to a gear sector 69 which is pivotally mounted on a pin 70 fixed to the housing 65. The rod 68 is eccentrically connected to the gear sector 69 with respect to the pin 70 so that although the gear 67 rotates completely and continues in one direction, the gear sector 69 rotates first in one direction and then in the opposite direction. An internal portion of the gear sector 69 has gear teeth which are meshed with a smaller gear member 71 that is fixed to the portion of the shaft 51 which extends into the housing 65. Thus, as the motor 57 operates at a constant rate, the gear sector 69 oscillates back and forth causing the shaft 51 and the camera 50 supported thereon to do likewise and swing through an arc of 180°. The speed of the shaft 51 has been reduced by the gear trains 58 and 61 and hence the camera movement is maintained at a relatively slow rate so that the instruments are scanned slowly and can be read easily on a television receiver.

The present invention is particularly useful in communities where closed circut television channels are utilized, where it can provide a means for transmitting a large amount of visual information without the need for a large number of skilled technicians to opertae the camera and other apparatus. It obviously can also be utilized for monitoring other types of data that can be presented on an elongated panel such as tabulating dials indicating the up to the minute totals of election returns for a number of candidates.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A remote weather information monitoring device for visually reproducing for remote observation a series of data producing instruments, said device comprising:

a vertically upright mounting board having a semi-circular shape;

a base member for supporting said mounting board;

a series of instrument dials attached in a fixed predetermined spaced apart relationship on said mounting board;

an upright oscillating shaft extending upwardly from said base member located horizontally a substantially equal distance from each of said instrument dials on said mounting board;

a television camera supported on said shaft and directed toward said mounting board;

a motor mounted on said base member;

and an oscillating gear drive means interconnecting said motor and said shaft for continuously turning said shaft back and forth on partial revolution cycles;

the said oscillating gear drive means including a pinion on the lower end of said shaft and an annular gear having a toothed segment meshed with said pinion;

a second gear opposite said annular gear driven by said motor;

an arm pivoted eccentrically at each end to said annular gear and said second gear, respectively;

whereby said television camera is caused to reversibly scan from one end of said mounting board to the other at a constant rate while viewing said dials.

2. An automatic television scanning device for visually reproducing for remote observation information supplied to a predetermined area, said device comprising:

a series of instrument dials mounted generally vertically in a semi-circular arrangement, said dials being supported in a fixed predetermined spaced apart relationship;

an upright oscillating shaft located at a point substantially equally distant from each of said instrument dials;

a television camera supported on the end of said shaft and directed toward said mounting board;

a motor for driving said shaft;

a transmission means interconnecting said motor and said shaft means for continuously turning said shaft and reversing its direction of turning at the end of each half revolution;

the said transmission means comprising an internal gear segment and a pinion on the lower end of said shaft intermeshed therewith;

a second gear having a driven connection with said motor;

and a link eccentrically pivoted at each end to said internal gear segment and said second gear, respectively;

whereby said television camera is caused to scan back and forth in front of said dials at a constant rate.

3. A device for systematically scanning and thereby reproducing for remote observation of the subject matter to be observed, the said device comprising:

a base housing having a semi-circular platform supported thereon;

a semi-circular panel conformably supported about the curved portion of said platform and extending vertically thereabove;

a series of instrument dials equi-distantly spaced along said panel;

a television camera mounted on said platform axially of the radius thereof and directed toward the said panel;

a shaft extending vertically through said platform rotatably supporting said camera and depending into said base housing and having a pinion on its lower end;

an annular gear pivotally mounted in said housing having a toothed segment meshed with said pinion on said shaft, the said annular gear being adapted for partial rotation in opposite directions to oscillate said camera;

a second gear in said housing spaced from said annular gear and a link connecting said gears and pivoted eccentrically thereto, respectively, at each end;

and a motor in said housing having a driving connection with said second gear;

whereby said camera is caused to be oscillated on said platform and scan said dials at a constant rate.

References Cited by the Examiner

UNITED STATES PATENTS

| | | | |
|---|---|---|---|
| 1,660,886 | 2/1928 | Randall | 178—6 |
| 2,393,638 | 1/1946 | Keinath et al. | 178—6 |
| 2,713,609 | 7/1955 | Niklason | 178—6 |
| 2,822,720 | 2/1958 | Douglas | 178—6 |
| 2,976,357 | 3/1961 | Hammett | 178—7.2 |
| 3,164,838 | 1/1965 | Heinrich | 178—7.9 |

OTHER REFERENCES

Closed Circuit Television Systems: R.C.A. Service Company (1958) Book I. Paragraphs 5–27, page 182 and paragraphs 5–100 to 5–105, page 207.

DAVID G. REDINBAUGH, *Primary Examiner.*

R. L. RICHARDSON, *Assistant Examiner.*